(12) United States Patent
Brösamle

(10) Patent No.: US 7,039,231 B2
(45) Date of Patent: May 2, 2006

(54) DEVICE FOR CORRECTING COLOR DISTORTIONS

(75) Inventor: Michael Brösamle, Weiterstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 459 days.

(21) Appl. No.: 10/432,145

(22) PCT Filed: Nov. 10, 2001

(86) PCT No.: PCT/EP01/13028

§ 371 (c)(1),
(2), (4) Date: May 16, 2003

(87) PCT Pub. No.: WO02/41639

PCT Pub. Date: May 23, 2002

(65) Prior Publication Data

US 2004/0042655 A1    Mar. 4, 2004

(30) Foreign Application Priority Data

Nov. 18, 2000 (DE) .............................. 100 57 273

(51) Int. Cl.
*G06K 9/00* (2006.01)

(52) U.S. Cl. ...................................... 382/167; 382/275
(58) Field of Classification Search ................ 382/167, 382/264, 275, 278, 282
See application file for complete search history.

(56) References Cited

U.S. PATENT DOCUMENTS

| | | | |
|---|---|---|---|
| 5,321,500 A | 6/1994 | Capitan et al. | ............... 348/97 |
| 5,467,412 A * | 11/1995 | Capitan et al. | ............ 382/167 |
| 5,673,336 A | 9/1997 | Edgar et al. | ................ 382/167 |

FOREIGN PATENT DOCUMENTS

JP            08214322          8/1996

OTHER PUBLICATIONS

International Search Report—Item #12 (enclosed).

* cited by examiner

*Primary Examiner*—Phuoc Tran
(74) *Attorney, Agent, or Firm*—Joseph S. Tripoli; Joseph J. Laks; Jorge Tony Villabon

(57) ABSTRACT

In a device for correcting color distortions due to aging processes of films when scanning the films, video signals generated by the scanning of selected picture areas extending over the picture width can be fed to a filter. The filter is designed to suppress noise components and picture content. Output signals of the filter can be fed as correction signals to a correction circuit for the video signals generated by the scanning of the film. The filter may be formed by applying an autocorrelation function to the video signals of the selected picture areas.

9 Claims, 2 Drawing Sheets

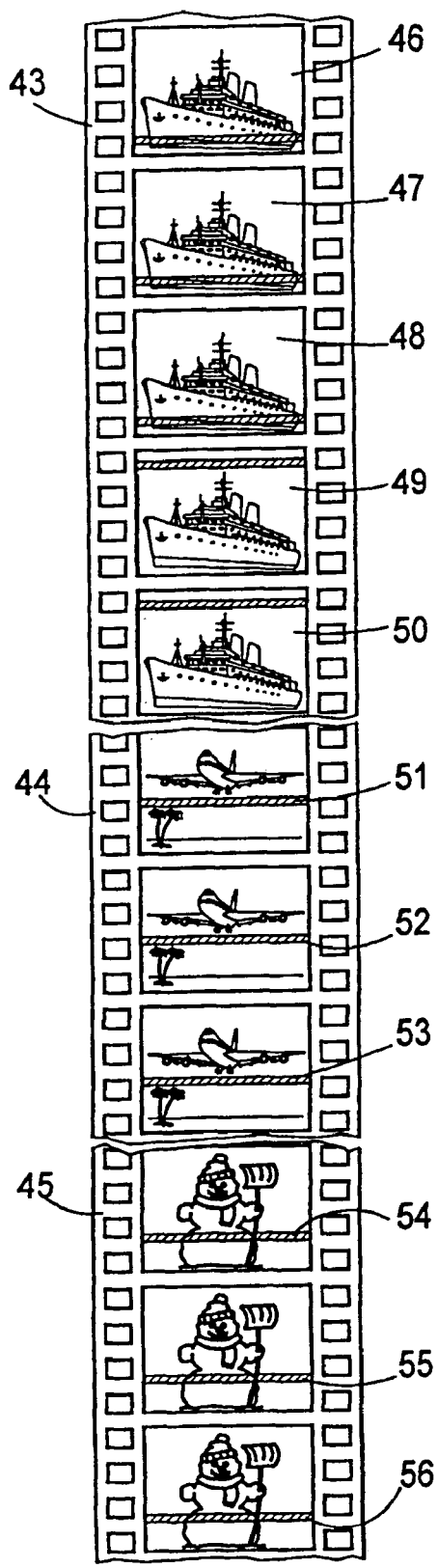
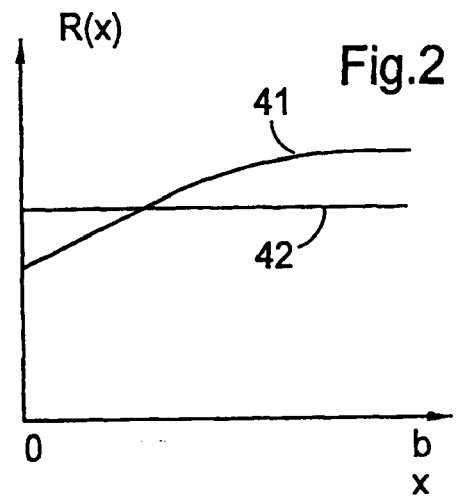

DEVICE FOR CORRECTING COLOR DISTORTIONS

This application claims the benefit under 35 U.S.C. §365 of International Application PCT/EP01/13028 filed Nov. 10, 2001, which claims the benefit of German Application No. 100 57 273.1, filed Nov. 18, 2000.

FIELD OF THE INVENTION

The invention relates to a device for correcting colour distortions due to ageing processes of films when scanning the films.

BACKGROUND

Due to ageing processes when storing colour films, colour distortions arise because the colour particles within the emulsion slowly follow the force of gravity (grain migration). This often affects red colour particles in the case of reversal films, while a distortion of the colours yellow and cyan arises in the case of colour negative films. These colour distortions become apparent for example such that an intrinsically single-coloured horizontal line which contains the relevant colour changes colour over its length.

The distortion of the respective colour component caused by the grain migration is essentially constant over the entire film—assuming the film was not composed of segments stored for different lengths of time or, if appropriate, comprising different materials.

SUMMARY OF THE INVENTION

It is an object of the present invention to specify a device for correcting these colour distortions when scanning the films which enables the best possible correction in conjunction with low operational outlay.

This object is achieved according to the invention by virtue of the fact that video signals generated by the scanning of selected picture areas extending over the picture width can be fed to a filter, that the filter is designed to suppress noise components and picture content, and that output signals of the filter can be fed as correction signals to a correction circuit for the video signals generated by the scanning of the film.

Particularly good suppression of the picture component is possible by means of one development of the invention, which consists in the filter being formed by applying an autocorrelation function to the video signals of the selected picture areas. In order to reduce the computational complexity, it may be provided in this case that the video signals of the selected picture areas are subjected to low-pass filtering before the application of the autocorrelation function.

If it is possible in the case of a film, to select picture areas with a monotonic picture content of a suitable colour, the filter may also merely comprise a low-pass filter.

In order to limit the computational complexity when forming the correction signal, in the case of the invention it may furthermore be provided that the picture areas have a height of one to a few lines.

An advantageous embodiment of the device according to the invention consists in the fact that the selection of the picture areas can be input by an operator. In this case, the operator can select picture areas of suitable coloration on the basis of his impression and his experience.

An embodiment with less operating effort consists in the fact that the picture areas are selected automatically according to whether a previously set colour component is present to a sufficient extent in the picture areas to be selected. In this case, it may be provided that the automatically selected picture areas are displayed to an operator before being scanned for the purposes of forming the correction signals, in which case possibilities exist for confirming or changing the picture areas.

In this embodiment, the previously set colour component depends on the type of film. In the case of colour negative film, depending on the film production period, one of the colour components magenta and cyan, if appropriate also yellow, is taken into consideration, which depends on the quality of the fixing of the respective colour particles. In the case of positive film, this is often the red colour component since these colour particles are the subject of the grain migration.

An advantageous refinement of the invention consists in the fact that the picture areas are selected at different picture heights and/or from different pictures and/or from different film scenes. In order to obtain the greatest possible suppression of the noise component, the grain component and the picture component in the correction signal, all of these variations of the picture areas presented can be employed for correcting a film. Given suitable picture contents, however, individual variations can be dispensed with.

BRIEF DESCRIPTION OF THE DRAWINGS

Exemplary embodiments of the invention are illustrated in the drawing using a plurality of figures and are explained in more detail in the description below. In the figures:

FIG. 2 shows the dependence of the red signal R as a function of the picture width, which arises as a result of migration of the red colour particles when storing the film, and FIG. 3 shows different sections of a film with selected picture areas.

DETAILED DESCRIPTION

Figure 1:
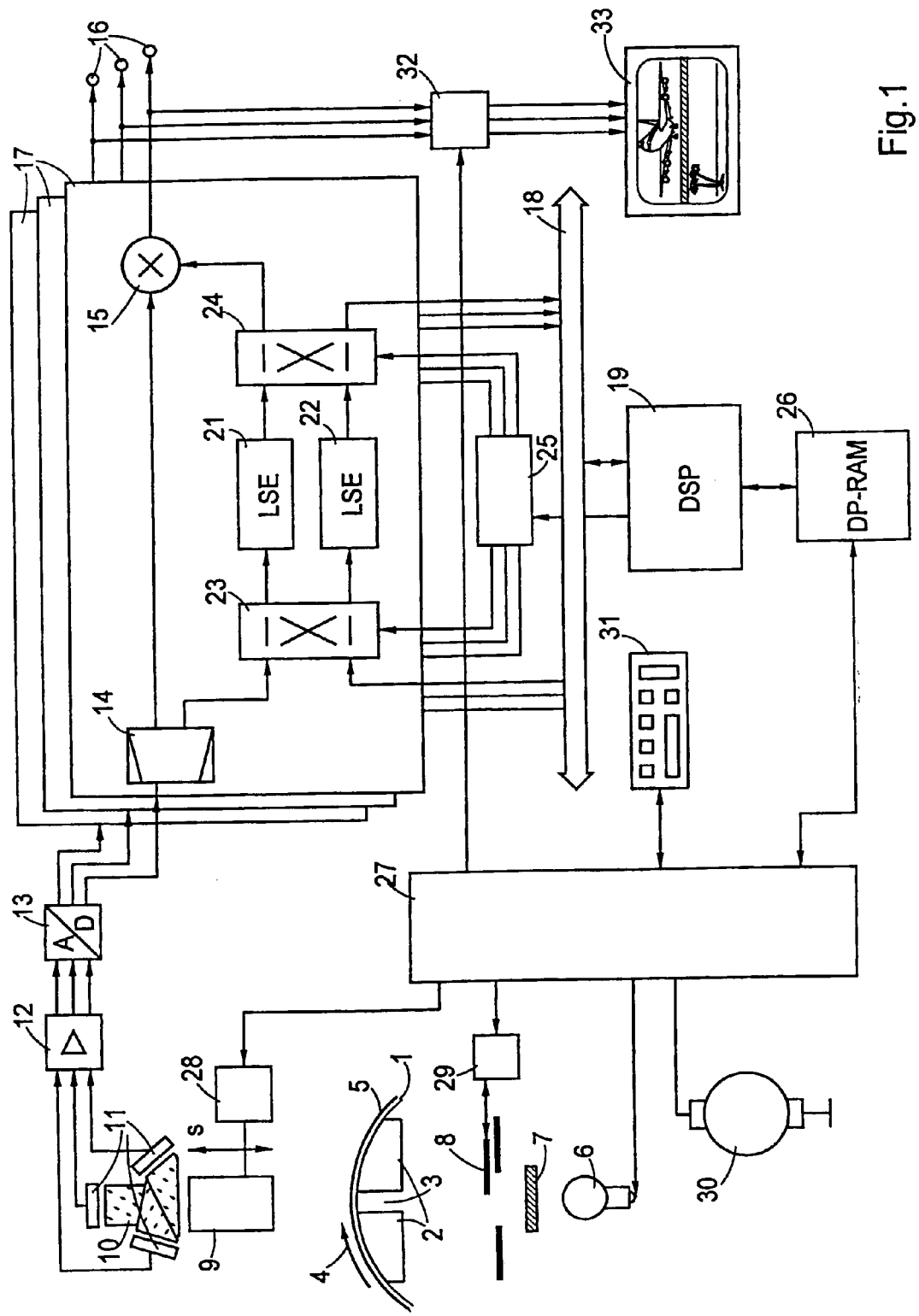
FIG. 1 shows a block diagram of a device according to the invention on a film scanner.

FIG. 1 diagrammatically contains only the parts of a film scanner which are necessary for explaining the invention. In this case, the film 1, shown enlarged with regard to its thickness, is guided by film guiding elements 2, which also form a film window 3. For continuous scanning of the film 1, the latter is moved for example in the direction of the arrow 4. In this case, the layer 5 of the film is arranged on that side of the film which does not come into contact with the film guiding elements 2.

The film is illuminated by an illumination device 6, a filter 7 and a diaphragm 8 being provided. The diaphragm 8 may be designed as an iris diaphragm with an additional diaphragm for completely interrupting the luminous flux. For the sake of clarity, only one diaphragm 8 interrupting the luminous flux is illustrated diagrammatically in FIG. 1.

Each illuminated line is imaged, with the aid of an objective 9 and a colour beam splitter 10, onto three line sensors 11 for generating colour value signals R, G and B. The output signals of the line sensors 11 are fed via preamplifiers 12 to analogue/digital converters 13, which are each illustrated only singly.

Three devices 17 serve for correcting colour distortions, only one of which device is illustrated in detail. This device contains a demultiplexer 14, a multiplicative correction circuit 15 and a memory device which is connected to a digital signal processor 19 via a data bus 18. The memory device comprises a number of line memory elements, of which, for the sake of clarity, only two 21, 22 are illustrated, a crossbar 23, 24 respectively being connected upstream and downstream of the said elements. The corrected digital colour value signals can be taken from outputs 16.

By means of the crossbar 23, signals respectively forming a line can optionally be written to the line memory elements 21, 22 from the demultiplexer 14 and from the digital signal processor 19 via the data bus 18, while signals read from the line memory elements 21, 22 via the crossbar 24 can be forwarded to the correction circuit 15 and, via the data bus 18, to the digital signal processor 19. The writing and the read-out including the distribution of the signals between the individual line memory elements 21, 22 are controlled by a control device 25 which, in turn, receives information from the digital signal processor 19 regarding which lines are to be written or read out in each case.

Moreover, the digital signal processor 19 is connected via a dual-port ram 26 to a processor 27 which serves to control the entire film scanner. In film scanners embodied in practice, such a task is generally divided between a plurality of processors, but this is insignificant to the explanation of the invention. Besides other functions, the processor 27 controls the sharp focusing of the objective 9 via a drive device 28. Furthermore, the processor 27 can control the illumination device 6 and, via a drive device 29, the diaphragm 8.

The processor 27 furthermore controls the entire drive unit of the film scanner, which drive unit comprises a plurality of motors and is illustrated diagrammatically by a motor symbol 30 in FIG. 1. An operating unit 31 connected to the processor 27 enables, in addition to the customary operating functions of a film scanner, the operation of the device according to the invention, in particular the selection of the picture areas. To that end, the film is moved with the aid of the drive device 30 to suitable pictures or film scenes and the picture area is selected by means of a suitable actuator on the operating unit 31. Accordingly, markers are generated in the processor 27 and, by means of a mixing circuit 32, are inserted into the video signals fed to a monitor 33.

The selection can then be confirmed on the operating unit 31, for example by pressing a key, whereupon the video signals associated with the selected picture area are read into the line memory elements 21, 22 by corresponding control of the demultiplexer 14 and the crossbar 23. The operator then selects further picture areas whose signals are likewise stored. After the selection of a sufficient number of picture areas, the digital signal processor 19 is started for filtering the stored signals by means of a corresponding input.

As already explained above, low-pass filtering may preferably be effected in a first stage in order to be able to implement the subsequent autocorrelation function with a lower computational complexity. At the end of the filtering process, one of the line memory elements 21, 22 holds the desired correction signal, which, during the subsequent reproduction mode of the film scanner, is repeatedly read out line by line and fed to the correction circuit 15. The effect of the correction can be observed on the monitor 33. If appropriate, refinement of the correction can be performed in a further step.

The selected picture areas correspond to a random sequence S(x,y,t), where x represents the column, y the relative line and t the sequence of different scanning instants. S(x,y,t) corresponds to the value at column x, line y at instant t. This sequence can then be processed statistically, inter alia by means of a special autocorrelation function which only analyses a sequence in the column direction.

$$K[(x1,y1),(x1,y2) \ldots (x1,yn)] := m[S(x1,y1)\ S(x1,y2) \ldots S(x1,yn)]$$

In this case, n denotes the number of successive lines. The expected value m is calculated according to the formula $$m(xn, yn) := \frac{1}{N} \sum_i S(xn, yn, ti)$$

In this case, N denotes the number of selected areas and i a counting parameter which is varied from 1 to N. The result of this operation is, to a good approximation, the function component common to all the functions.

FIG. 2 shows an example of the effect of the migration of the colorant particles, giving rise to a profile 41 of the red signal R as a function of the horizontal position x between one picture edge at x=0 and the other picture edge at x=b which deviates from a red signal with a uniform profile over the picture width (curve 42). This deviation is compensated for by the device according to the invention, so that, for a constant profile of the red signal over the picture width existing prior to storage, the correction again results in a constant profile of the red signal.

The selection of picture areas suitable for correction is explained below with reference to FIG. 3, which shows three sections 43, 44, 45 of a film with different film scenes. The selected picture areas are identified by hatching in each case. The same picture area was selected from each of the pictures 46 to 48, the colour of the ship prevailing in this picture area, while a picture area representing the sky was selected from pictures 49 and 50.

The picture areas selected at the same picture height serve to suppress the noise including the grain of the film. The evaluation of picture areas of a different picture height already serves to suppress the picture content. This does not suffice in many cases, however, for example if the relevant film picture does not contain a distinct vertically running structure or if there is a desired colour profile not caused by the film ageing in the respective scene. Therefore, in the exemplary embodiment illustrated, pictures areas 51 to 53 were additionally selected from section 44 and picture areas 54 to 56 from section 45.

It is pointed out in this connection that the quality of the correction ultimately depends on the selection of the picture areas and the filtering, in particular the computational complexity for the filtering. By way of example, a skilful selection of the picture areas can lead to a good correction even in the case of a small selection of film scenes. The device according to the invention additionally allows a calculated correction to be altered after its application in a trial run and thus a good result to be attained by means of an, if appropriate, repeated iteration.

The video signals of the selected picture areas are filtered for the purpose of deriving the correction signal, as already explained in connection with FIG. 1.

What is claimed is:

1. Device for correcting color distortions due to aging processes of films when scanning the films, wherein
video signals generated by the scanning of selected picture areas (51 to 56) extending over the picture width can be fed to a filter (18 to 24), in that the filter is designed to suppress noise components and picture content, and in that output signals of the filter can be fed as correction signals to a correction circuit (15) for the video signals generated by the scanning of the film.

2. Device according to claim 1, wherein the filter is formed by applying an autocorrelation function to the video signals of the selected picture areas.

3. Device according to claim 2, wherein the video signals of the selected picture areas are subjected to low-pass filtering before the application of the autocorrelation function.

4. Device according to claim 1, wherein the filter is a low-pass filter.

5. Device according to claim 1, wherein the picture areas have a height of one to a few lines.

6. Device according to claim 1, wherein the selection of the picture areas can be input by an operator.

7. Device according to claim 1, wherein the picture areas are selected automatically according to whether a previously set color component is present to a sufficient extent in the picture areas to be selected.

8. Device according to claim 7, wherein the automatically selected picture areas are displayed to an operator before being scanned for the purposes of forming the correction signals, in which case possibilities exist for confirming or changing the picture areas.

9. Device according to claim 1, wherein the picture areas are selected at different picture heights and/or from different pictures and/or from different film scenes.

* * * * *